United States Patent
Ogoshi et al.

(10) Patent No.: US 11,619,600 B2
(45) Date of Patent: Apr. 4, 2023

(54) SURFACE ANALYZER

(71) Applicant: Shimadzu Corporation, Kyoto (JP)

(72) Inventors: Akira Ogoshi, Kyoto (JP); Takehiro Ishikawa, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 65 days.

(21) Appl. No.: 17/407,124

(22) Filed: Aug. 19, 2021

(65) Prior Publication Data
US 2023/0039168 A1    Feb. 9, 2023

(30) Foreign Application Priority Data

Dec. 4, 2020    (JP) .............................. JP2020-201721

(51) Int. Cl.
| | | |
|---|---|---|
| *G06K 9/62* | (2022.01) | |
| *G01N 23/225* | (2018.01) | |
| *G01N 23/2251* | (2018.01) | |
| *G01N 23/2252* | (2018.01) | |

(52) U.S. Cl.
CPC ..... *G01N 23/2252* (2013.01); *G01N 23/2251* (2013.01); *G06K 9/6219* (2013.01)

(58) Field of Classification Search
CPC .................................................. G06K 9/6219
See application file for complete search history.

(56) References Cited

U.S. PATENT DOCUMENTS

2016/0110896 A1* 4/2016 Mori .................... G01N 23/225
345/637

FOREIGN PATENT DOCUMENTS

| JP | 2006125952 A | 5/2006 |
|---|---|---|
| JP | 2011153858 A | 8/2011 |

OTHER PUBLICATIONS

Ester et al., "A Density-Based Algorithm for Discovering Clusters in Large Spatial Databases with Noise," Proceedings of 2nd International Conference on Knowledge Discovery and Data Mining (KDD-96 Proceedings), pp. 226-231, 1996.
Campello et al., "Density-Based Clustering Based on Hierarchical Density Estimates," Springer, pp. 160-172, 2013.

* cited by examiner

Primary Examiner — Mark R Gaworecki
(74) Attorney, Agent, or Firm — Muir Patent Law, PLLC

(57) ABSTRACT

An object of the present invention is to improve the accuracy of clustering by avoiding detection of false clusters when automatically clustering points on a scatter diagram. A surface analyzer according to a first aspect of the present invention includes a measurement unit (1-2, 4-8) configured to acquire a signal reflecting a quantity of a plurality of components or elements that are analysis targets at a plurality of positions on a sample (3), a scatter diagram generation unit (92) configured to generate a binary scatter diagram based on a measurement result by the measurement unit, a clustering unit (94) configured to perform clustering of points in the binary scatter diagram using a method of a density-based clustering, and a parameter adjustment unit (93) configured to adjust a distance threshold by utilizing distribution information on a signal value of the components or the elements on either axis in the binary scatter diagram, the distance threshold being one of parameters to be set in the density-based clustering.

8 Claims, 12 Drawing Sheets

SURFACE ANALYZER

CROSS-REFERENCE TO RELATED APPLICATIONS

This application claims priority under 35 U.S.C. § 119 to Japanese Patent Application No. 2020-201721 filed on Dec. 4, 2020, the entire disclosure of which is incorporated herein by reference in its entirety.

TECHNICAL FIELD

The present invention relates to a surface analyzer for examining a distribution of components or elements present in a one-dimensional or two-dimensional measurement region on a sample. This surface analyzer includes an electron probe micro analyzer (EPMA), a scanning electron microscope (SEM), a fluorescent X-ray analyzer, etc.

BACKGROUND OF THE INVENTION

In elemental mapping analysis using an EPMA, the type and quantity of contained elements can be examined for each of a large number of minute regions in a two-dimensional region on a sample. The following methods are often used when analyzing the result of the elemental mapping analysis. That is, a scatter diagram (a diagram in which each axis of two or three axes represents the relative intensity of each element) of an element concentration calculated from the characteristic X-ray intensity or its intensity for two elements or three elements is generated. Then, from the distribution of plot points on the diagram, the type or the content ratio of the compound contained in the sample is confirmed. That is, a phase analysis is often used (see Patent Documents 1 and 2). For example, FIG. 10 of Patent Document 2 shows an example of a binary scatter diagram. Further, FIG. 11 of Patent Document 2 shows an example of a ternary scatter diagram.

One point on a scatter diagram (hereinafter, a point plotted on a scatter diagram is referred to as a "data point") corresponds to one point (minute region) on a sample. Therefore, it is estimated that a region in which data points are densely distributed on the scatter diagram corresponds to a site in which the contained elements are contained at a similar ratio on the sample.

Therefore, in a phase analysis, in general, an analyst recognizes a region in which data points are densely distributed on a scatter diagram as a cluster, i.e., a set of associated data points. An analyst uses a pointing device, such as, e.g., a mouse, to perform an operation of surrounding the region with a suitable shape, such as, e.g., a polygon. Further, the analyst performs an operation of specifying a different color for each region. When such an operations is performed, a phase map is displayed on the display of the EPMA display device. In this phase map, the position on the sample corresponding to each data point included in one or a plurality of cluster regions is colored with a specified color.

In recent years, with the rapid development of AI (artificial intelligence) technology, it has been attempted to perform processing of automatically allocating a large number of data points on a scatter diagram to a plurality of sets by using such a technology. For such processing, clustering, which is a typical method of unsupervised machine learning, is suitable.

A variety of algorithms are known for clustering. As a method for dividing data points on a scatter diagram into a plurality of clusters according to its density, for example, the density-based clustering disclosed in Non-Patent Documents 1 and 2, etc., is useful. FIG. 12 shows an example in which clusters are automatically extracted by using density-based clustering with respect to a binary scatter diagram acquired by actual measurement. In this example, it can be seen that six clusters have been extracted.

PRIOR ART DOCUMENT

Patent Document

Patent Document 1: Japanese Unexamined Patent Application Publication No. 2006-125952
Patent Document 2: Japanese Unexamined Patent Application Publication No. 2011-153858

Non-Patent Document

Non-Patent Document 1: Ester M., and three others, "A Density-Based Algorithm for Discovering Clusters in Large Spatial Databases with Noise", Proceedings of 2nd International Conference on Knowledge Discovery and Data Mining (KDD-96, pp. 226-231, 1996
Non-Patent Document 2: Ricardo J. G. B. Campello, and two others, "Density-Based Clustering Based on Hierarchical Density Estimates," Springer, pp. 160-172, 2013

SUMMARY OF THE INVENTION

Problems to be Solved by the Invention

However, in a scatter diagram generated based on data acquired by an EPMA, an uneven distribution and/or a specific distribution of data points may sometimes occur depending on various factors. For this reason, a false cluster may be detected when the above-described conventional clustering method is applied.

For example, FIG. 4 is a diagram showing a result of automatic clustering of data points on a binary scatter diagram generated based on an actual measurement result. In the figure, the region surrounded by the polygonal line is one cluster region automatically detected. At two points indicated by an arrow in the figure, a large number of small clusters linearly extending in the vertical direction have been detected. It is appropriate that they are originally detected as one large cluster at each portion. In other words, a small cluster linearly extending in the vertical direction is a false cluster.

FIG. 8 is a diagram showing a result of automatic clustering of data points on a ternary scatter diagram generated based on an actual measurement result. In the figure, the region surrounded by the polygonal line is one cluster region automatically detected. As is apparent from FIG. 8, in the ternary scatter diagram, a set of linearly continuous data points may appear radially, but a plurality of small range clusters including a part of the set of data points has been detected. They include those that are not necessarily appropriate as clusters, and many of them are false clusters.

The present invention has been made to solve the above-described problems. A main object of the present invention is to provide a surface analyzer capable of suppressing a false cluster detection when automatically clustering data points on a scatter diagram to improve the clustering accuracy.

Means for Solving the Problem

In a surface analyzer according to a first aspect of the present invention made to solve the above-described problems, the surface analyzer includes:

a measurement unit configured to acquire a signal reflecting a quantity of a plurality of components or elements that are analysis targets at a plurality of positions on a sample;

a scatter diagram generation unit configured to generate a binary scatter diagram based on a measurement result by the measurement unit;

a clustering unit configured to perform clustering of data points on the binary scatter diagram using a method of density-based clustering; and a parameter adjustment unit configured to adjust a distance threshold by utilizing distribution information on a signal value of the components or the elements on either axis in the binary scatter diagram, the distance threshold being one of parameters to be set in the density-based clustering.

Further, in a surface analyzer according to a second aspect of the present invention made to solve the above-described problems, the surface analyzer includes:

a measurement unit configured to acquire a signal reflecting a quantity of a plurality of components or elements that are analysis targets at a plurality of positions on a sample;

a scatter diagram generation unit configured to generate a ternary scatter diagram based on a measurement result by the measurement unit;

a data point selection unit configured to exclude, by utilizing distribution information on a summing signal value acquired by adding signal values of three components or elements corresponding to data points in the ternary scatter diagram, data points having a predetermined signal value range in which the summing signal value is relatively small from all data points present in the ternary scatter diagram; and a clustering unit configured to perform clustering of the data points on the ternary scatter diagram that has not been excluded by the data point selection unit, by using a method of a density-based clustering.

The surface analyzer according to the first and second aspects of the present invention is an analyzer, such as, e.g., an EPMA, a SEM, and a fluorescent X-ray analyzer. In such an analyzer, measurement is repeated while changing the irradiation position of an excitation beam (e.g., an electron beam or X-rays) on a sample. With this, it is possible to acquire a signal reflecting the abundance of a plurality of elements at each of a large number of positions in a two-dimensional region or one-dimensional region on the sample.

Further, in a surface analyzer according to the first and second aspects of the present invention, a hierarchical density-based spatial clustering with noise which is an improvement of a general density-based spatial clustering with noise (DBSCAN) can be used as a clustering method.

Effects of the Invention

In the density-based spatial clustering with noise, a distance threshold c is a key parameter for clustering. In particular, in the hierarchical density-based spatial clustering with noise, this threshold c is automatically adjusted according to the density of data points on the scatter diagram. As described above, in the binary scatter diagram shown in FIG. 4, a plurality of false clusters linearly extending in the vertical directions has been detected. On the other hand, a set of data points present at the lower region (the region with high intensity of Fe) in the binary scatter diagram has been properly recognized as a single cluster.

Presuming from the densities of data points on the scatter diagram, in the lower region in the binary scatter diagram, the threshold c is set appropriately because the frequency of data points is not so high in the first place. As a result, it is considered that the distance between data points classified into one cluster is increased. On the other hand, in the upper region (the region with lower intensity of Fe) in the binary scatter diagram, the frequency of data points is much higher than that in the lower region.

As in this example, in a case where the intensity of one element (Mn in this example) out of two elements is extremely low and the measurement range of the data of the element (the range of the X-ray intensity, which is the measurement result) is narrow, there exist data points as follows. That is, in one direction (in this case, in the vertical direction), data points are distributed at a higher density. In the other direction (in this case, in the lateral direction), data points are discretely distributed. For this reason, according to normal automatic parameter adjustment procedures, the threshold c is determined by reflecting the state in which the data points in the vertical direction are extremely densely distributed. For this reason, it is presumed that a set of data points discretely appearing in the lateral direction is erroneously recognized as a discrete cluster.

In contrast, in the surface analyzer according to the first aspect of the present invention, the parameter adjustment unit adjusts the value of the distance threshold ε, by utilizing the distribution information on the signal value of either one of the elements at the data points in the binary scatter diagram. That is, the value of the distance threshold c is adjusted by utilizing the information on how much the signal value is densely or discretely distributed. That is, the parameter adjustment unit adjusts the distance threshold c depending on the distribution degree of the signal values of the data points in the axis direction in which a discrete linear data point set is likely to be formed when the density of data points on the binary scatter diagram is high due to the narrow intensity range. With this, the distance threshold c is adjusted so that the entire set of a plurality of discrete linear data points that are closely distributed on the scatter diagram is included in one cluster. Thus, appropriate clustering can be performed.

When generating a ternary scatter diagram as shown in FIG. 8, as described in Patent Document 1, the normalization needs to be performed with a sum of the intensities of three elements for each data point of the ternary scatter diagram. Therefore, in a case where there are a large number of data points with similar intensity ratios of three elements, the distribution of radially extending linear data points appears in the ternary scatter diagram. The inventors of the present invention have found that when a false cluster including a linear point distribution is detected as shown in FIG. 8, the following is true. That is, the inventors of the present invention have found that there exist a large number of data points in which the intensity of each of three elements is small and that this large number of data points greatly contributes to the generation of a radially extending linear data point distribution.

On the other hand, in a surface analyzer according to a second aspect of the present invention, the data point selection unit generates a histogram. For example, this histogram indicates the relation between the summed signal value class and the frequency, as the distribution information on the summed signal value acquired by adding the signal values of the three components or elements corresponding to the data points in the ternary scatter diagram. In a case where there exist many data points with the small intensity of three elements as described above, a relatively large peak will appear in the histogram at a point where the summed signal value is small.

Therefore, the data point selection unit excludes the data point that forms the peak from all data points. The clustering unit executes clustering only for the remaining data points. This eliminates the distribution of the radially extending linear data points in the ternary scatter diagram and can avoid the detection of the false cluster associated therewith.

As described above, in the surface analyzer according to the first and second aspects of the present invention, the detection of a false cluster is suppressed when automatically clustering data points on the scatter diagram. Further, it is possible to improve the accuracy of clustering of data points, i.e., minute regions on the sample based on the concentration of a plurality of components or elements. This allows the user to accurately and efficiently perform the phase analysis based on, for example, clustering results of data points on the scatter diagram.

EMBODIMENTS FOR CARRYING OUT THE INVENTION

First Embodiment

Figure 1:
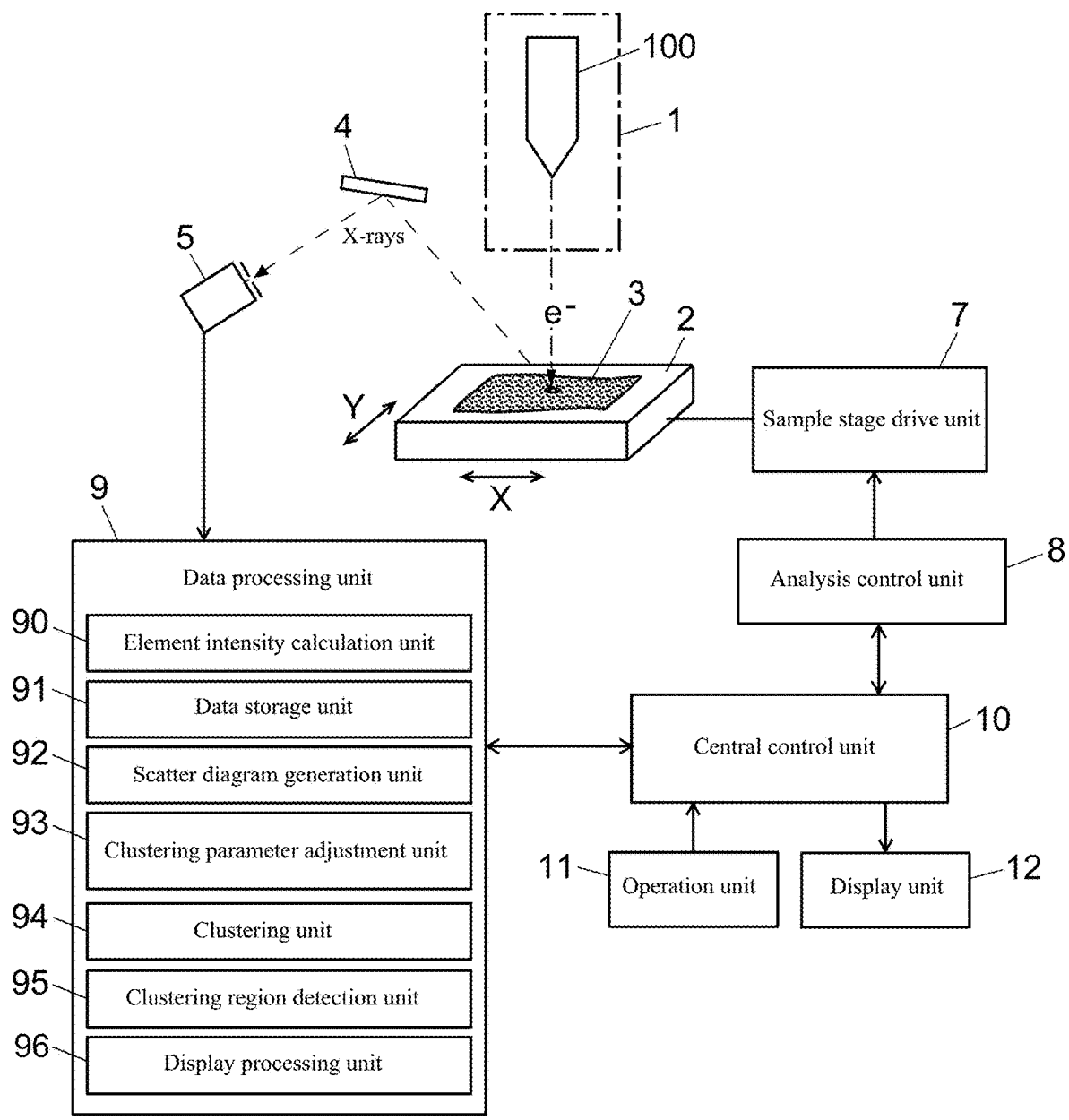
FIG. 1 is a configuration diagram of a main part of an EPMA according to a first embodiment of the present invention.

An EPMA which is a surface analyzer according to a first embodiment of the present invention will be described with reference to the accompanying figures. FIG. 1 is a configuration diagram of a main part of the EPMA according to the first embodiment.

As shown in FIG. 1, an electron beam irradiation unit 1 includes an electron gun 100, a deflection coil (not shown), etc., and emits an electron beam of a minute diameter to a sample 3 placed on a sample stage 2. Receiving this electron beam, characteristic X-rays having a wavelength specific to an element are released from the surface of the sample 3. Further, a secondary electron and the like are also released from the surface of the sample 3.

The characteristic X-rays released from the sample 3 are wavelength-dispersed by the dispersive crystal 4, and diffracted X-rays of a particular wavelength are detected by an X-ray detector 5. The electron beam irradiation position on the sample 3, the dispersive crystal 4, and the X-ray detector 5 are always located on a Rowland circle, and the dispersive crystal 4 is inclined while moving linearly by a drive mechanism (not shown). The X-ray detector 5 is rotated in conjunction with this motion. With this, in such a manner as to satisfy the Bragg's diffraction conditions, that is, while keeping the incident angle of the characteristic X-rays to the dispersive crystal 4 and the outgoing angle of the diffracted X-ray equal, the wavelength scan of the X-rays as an analysis target is achieved. The detection signal of the X-ray intensity by the X-ray detector 5 is input to a data processing unit 9.

The sample stage 2 is movable in biaxial directions of the X-axis and the Y-axis perpendicular to each other by a sample stage drive unit 7. With this motion, the irradiation position of the electron beam on the sample 3 is scanned two-dimensionally. Further, rather than moving the sample stage 2, by deflecting the injection direction of the electron beam in the electron beam irradiation unit 1, it is also possible to scan the irradiation position of the electron beam on the sample 3.

The data processing unit 9 includes, as functional blocks, an element intensity calculation unit 90, a data storage unit 91, a scatter diagram generation unit 92, a clustering parameter adjustment unit 93, a clustering unit 94, a cluster region detection unit 95, a display processing unit 96, and the like. The analysis control unit 8 controls operations of, e.g., a drive mechanism to move the dispersive crystal 4 and/or the X-ray detector 5 in addition to the sample stage drive unit 7, to perform the analysis on the sample 3. A central control unit 10 is responsible for the control and the input-output processing of the entire device. Connected to the central control unit 10 are an operation unit 11 including a keyboard and a mouse (or other pointing devices), and a display unit 12.

For example, all or a part of the central control unit 10, the analysis control unit 8, and the data processing unit 9 are configured by a personal computer. Each function is accomplished by executing dedicated control/processing software installed on the computer.

When performing an element mapping analysis in an EPMA of this embodiment, the analysis control unit 8 fixes the position of the dispersive crystal 4 corresponding to the characteristic X-ray wavelength of the target element. Then, the sample stage drive unit 7 or the like is operated so as to repeatedly detect characteristic X-rays and secondary electrons while changing the irradiation position (minute region) of the electron beam in a predetermined order in a predetermined two-dimensional region (normally specified by an analyst) on the sample 3. After the intensity distribution for one element has been acquired, the same measurement is performed for the other target elements.

The element intensity calculation unit 90 acquires the intensity (concentration) of the target element for each minute region on the sample 3. This intensity data is stored in the data storage unit 91. Note that when an energy dispersive X-ray spectrometer is used, the element intensity calculation unit 90 generates an X-ray spectrum for each minute region in the two-dimensional region, detects the peak of the specified wavelength corresponding to the target element on the X-ray spectrum, and acquires the peak intensity. With this, it is possible to calculate the intensity (concentration) of the objective element.

When the measurement of all minute regions in the two-dimensional region on the sample 3 has been completed and an analyst performs the predetermined operations from the operation unit 11, the scatter diagram generation unit 92 reads out the predetermined data from the data storage unit 91 and generates a binary scatter diagram indicating the relation between the intensities of the predetermined two elements. Each data point on the binary scatter diagram point corresponds to each minute region on the sample 3. Thus, for example, when measurement is performed on 1,000 minute regions on the sample 3, the number of data points to be plotted on the scatter diagram is 1,000.

The clustering unit 94 performs clustering according to a predetermined algorithm for all data points on the generated scatter diagram and labels each data point as to whether it belongs to one or more clusters or neither.

Various methods are known for clustering. Generally, in clustering data points on such a scatter diagram, clustering using a distance between data points is performed. In a scatter diagram acquired by a surface analysis of an EPMA, an extremely high-density portion of data points and an extremely low-density portion of data points often occur. In the portion in which data points are densely distributed, even if the distance between data points is relatively short, a cluster in which the number of data points is extremely large is formed unless separated into discreet clusters. Conversely, in the portion where data points are present at a low density, even if the distance between data points is relatively long, a cluster in which the number of data points is extremely small is formed unless included in the same cluster. In order to cope with this problem, here, a hierarchical density-based clustering method disclosed in Non-Patent Document 2 is adopted for clustering. This method is an improvement of a general density-based clustering disclosed in Non-Patent Document 1, and according to the study of the present inventors, it is possible to perform clustering of data points on a scatter diagram acquired by an EPMA fairly well.

In a density-based clustering including the hierarchical density-based clustering described above, the following two parameters need to be predetermined in order to determine that a set of data points on the scatter diagram is a cluster.

(1) Minimum Cluster Size: the minimum number of data points (the minimum number of data points constituting a single cluster) required to determine a cluster (2) Distance threshold c: a distance threshold for determining that two adjacent clusters are distinct clusters. A plurality of clusters closer in the distance than the threshold is automatically integrated.

In order to successfully detect a cluster on a scatter diagram, the above-described parameter needs to be set to an appropriate value. However, since it is cumbersome for a user (analyst) to set each of these parameters, the value determined experimentally by a manufacturer is set to each parameter as a default value, and the user can change the value manually.

Figure 2:
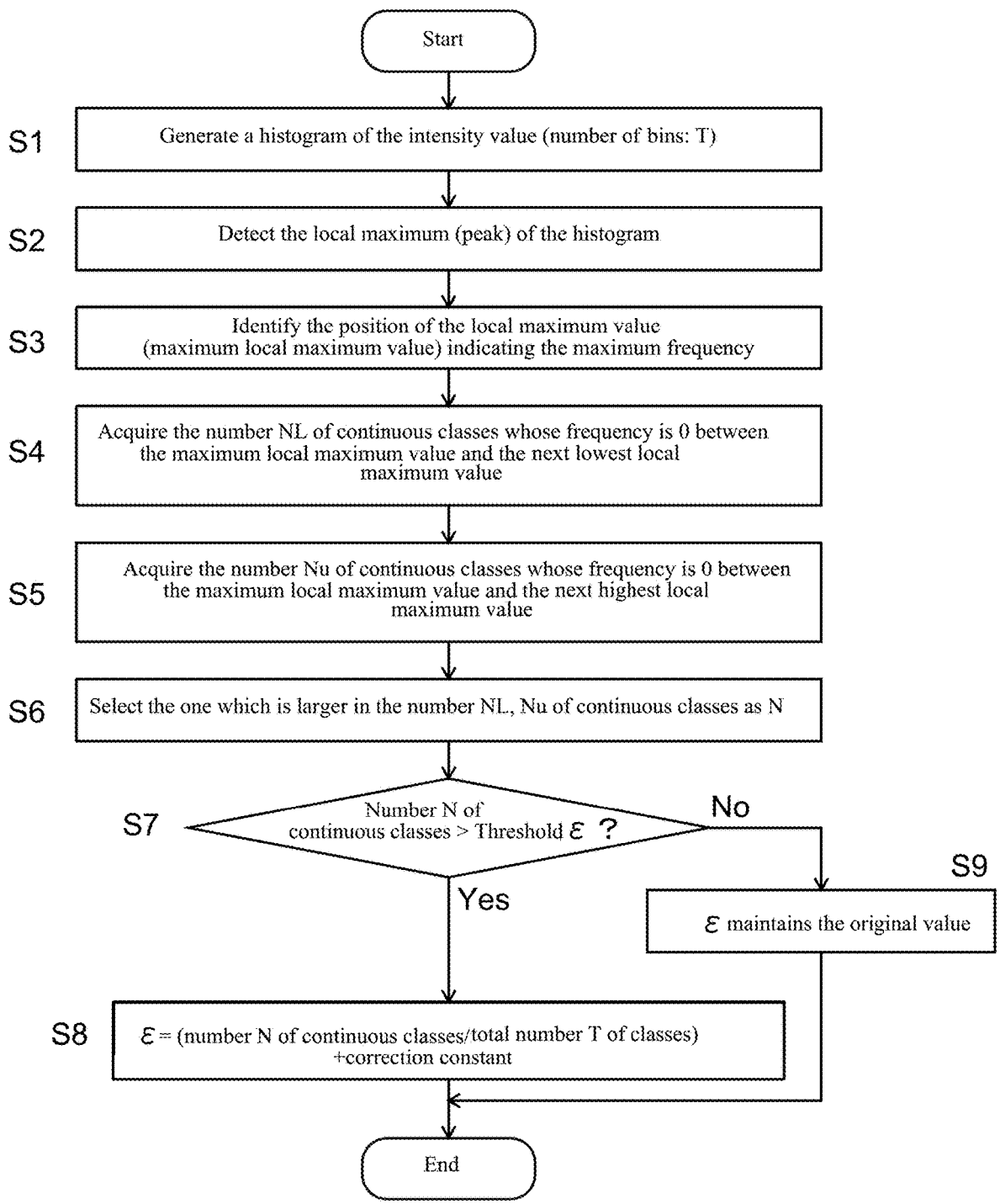
FIG. 2 is a flowchart showing an example of clustering parameter adjustment processing in the EPMA of the first embodiment.

In a case where the intensity range of each of the two elements reflected on a binary scatter diagram is relatively close and the measurement range (intensity range) is at the same level, approximately appropriate clustering can be performed even if the default value is used as the distance threshold $\varepsilon$. However, as described above, in a case where there is a relatively large difference between the abundances (concentrations) of two elements and the intensity range of the element having a smaller abundance is extremely small, a characteristic false cluster derived therefrom is easily detected. Therefore, it is impossible to integrate a plurality of false clusters into one without adjusting the distance threshold c to an appropriate value according to the spatial distribution of data points. Therefore, the clustering parameter adjustment unit 93 adjusts the distance threshold c in the following manner prior to actually performing the clustering. FIG. 2 is a flowchart showing an example of clustering parameter adjustment processing.

Figure 3:
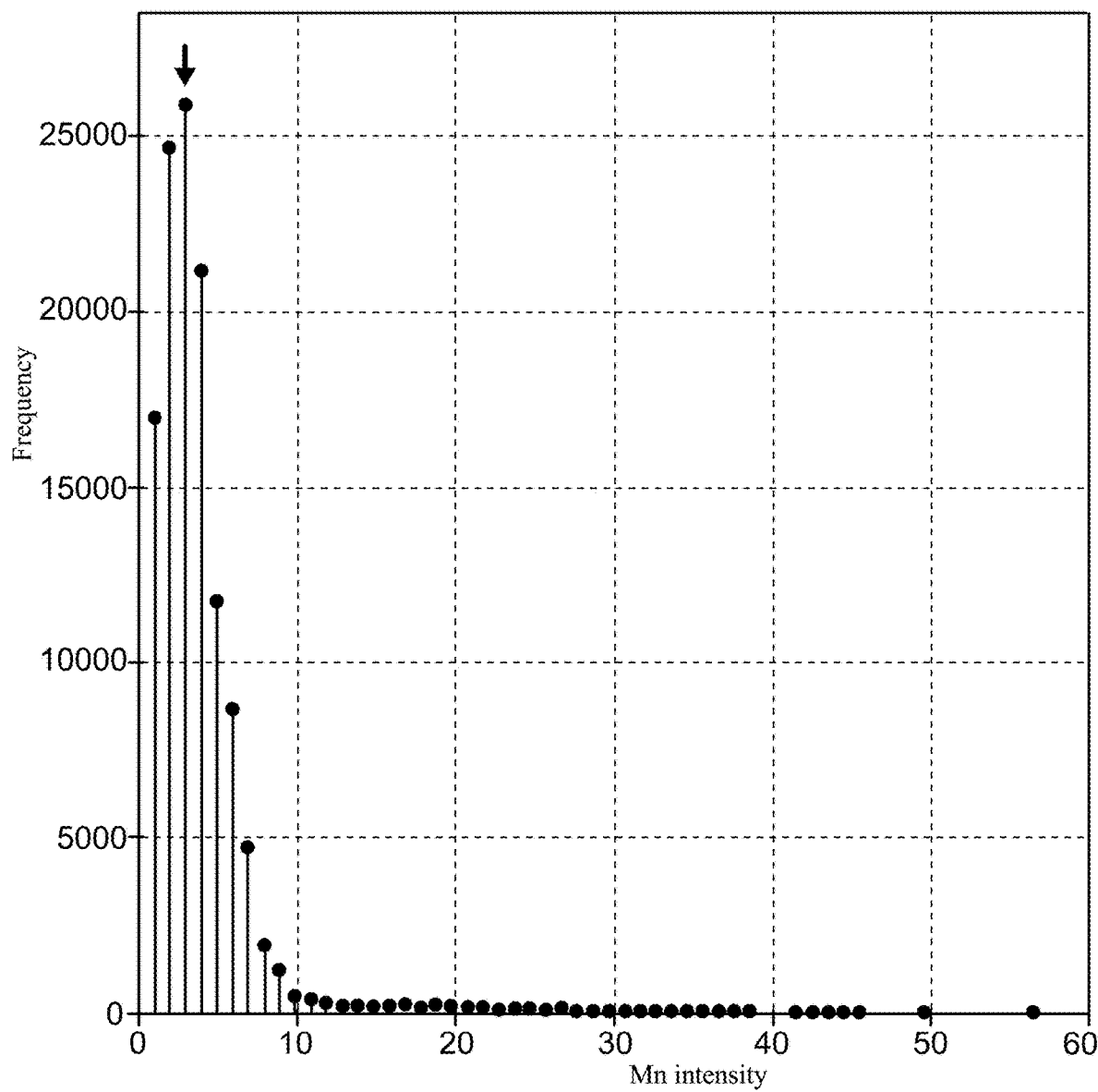
FIG. 3 is a diagram showing an example of a histogram of an intensity value of an element with a narrow intensity range.

First, in order to determine the distribution state of the intensity value of an element having a narrower intensity range (Mn in FIG. 4), the clustering parameter adjustment unit 93 generates a histogram of the intensity value of the element (Step S1). At this time, the number of class T of the intensity value is appropriately determined. FIG. 3 shows a histogram corresponding to the data points on the binary scatter diagram shown in FIG. 4. Here, the number of class T is set to 1,000. As shown in FIG. 3, it can be seen that a histogram reflecting data points in which the intensity range is narrow and only discrete data points are present has an extremely high frequency at a particular class, resulting in a comb-like gap between a plurality of particular classes. Thus, due to the fact that the frequency distribution of the intensity values shows a characteristic tendency, the binary scatter diagram is acquired as described above and a false cluster is detected.

In a density-based clustering, a cluster is more likely to be formed at a portion where the degree of integration of data points is high on a scatter diagram, that is, at a portion where the frequency is high. For this reason, the clustering parameter adjustment unit 93 detects a local maximum value, i.e., a peak, in the above-described histogram and finds the class corresponding to the peak (Step S2). Further, a class with the maximum frequency in a class showing the local maximum value is specified (Step S3). In FIG. 3, the class where the frequency is the maximum in the class showing the local maximum value is indicated by a downward arrow.

Then, the clustering parameter adjustment unit 93 determines a continuous number NL of a class in which the frequency is 0 in the histogram between a class indicating the maximum local maximum value and a class indicating the next lowest local maximum value (the side with the smaller intensity values) (Step S4). Further, the clustering parameter adjustment unit 93 acquires a continuous number Nu of a class in which the frequency is 0 in the histogram between a class indicating the maximum local maximum value and a class indicating the next highest local maximum value (the side with the larger intensity values) (Step S5). In other words, a continuous number of a class in which the frequency is 0 is determined on both sides of the class indicating the maximum local maximum value.

Thereafter, the clustering parameter adjustment unit 93 compares the continuous number NL acquired in Step S4 with the continuous number Nu acquired in Step S5 to determine the larger value as a number N of continuous classes N (Step S6), and determines whether or not the number N of continuous classes N is larger than the distance threshold c at that time (Step S7). When the number N of continuous classes is equal to or less than the distance threshold ε, since the threshold c does not need to be corrected, the value is maintained (Step S9), and the processing ends. On the other hand, when the number N of continuous classes N is larger than the distance threshold ε, the clustering parameter adjustment unit 93 corrects the value of the threshold c using the following Expression (1) (Step S8), and the processing ends.

$$\varepsilon = (\text{number } N \text{ of continuous classes/total number } T \text{ of classes}) + \text{correction constant } K \quad (1)$$

The value of the correction constant K may be appropriately determined experimentally. Here, it is assumed to be 0.002.

Using the Expression (1), the length of the interval in which the frequency present before and after the class indicating the highest frequency is 0 is reflected, and therefore the distance recognized as a separate cluster in a region in which data points included in the class indicating the highest frequency in a binary scatter diagram are densely distributed becomes longer. This makes it easier to integrate a plurality of clusters having a smaller separation distance into one cluster.

Thereafter, the clustering unit 94 performs clustering of data points on the binary scatter diagram on condition of the parameters modified as described above. With this, each data point on the binary scatter diagram is labeled as to whether or not it belongs to any one of one or a plurality of clusters or neither. In this situation, it is difficult to treat a region occupied by a cluster in the scatter diagram because each data point is simply labeled. For this reason, the cluster region detection unit 95 defines a polygonal cluster region including all or most of the data points belonging to each cluster by using a suitable technique, such as, e.g., a convex hull method. Note that, in the binary scatter diagram shown in FIG. 4, the linear cluster region extending in the vertical direction and the rectangular region including a number of data points drawn in the lower region in the drawing are also acquired by the above-described cluster region detecting processing.

Figure 4:
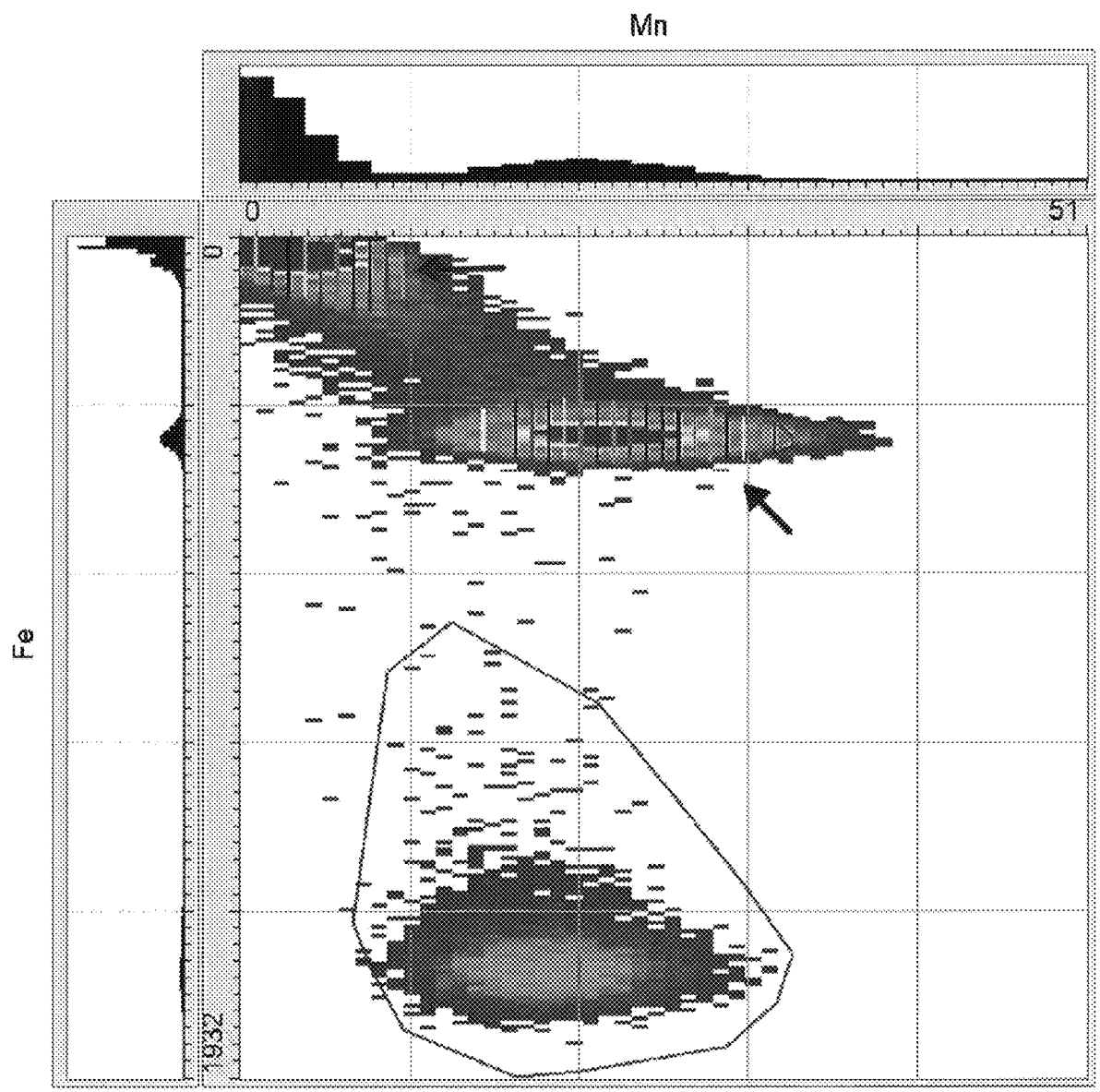
FIG. 4 is a diagram showing an example in which false clusters are detected as a result of automatically performing clustering data points on a binary scatter diagram.
Figure 5:
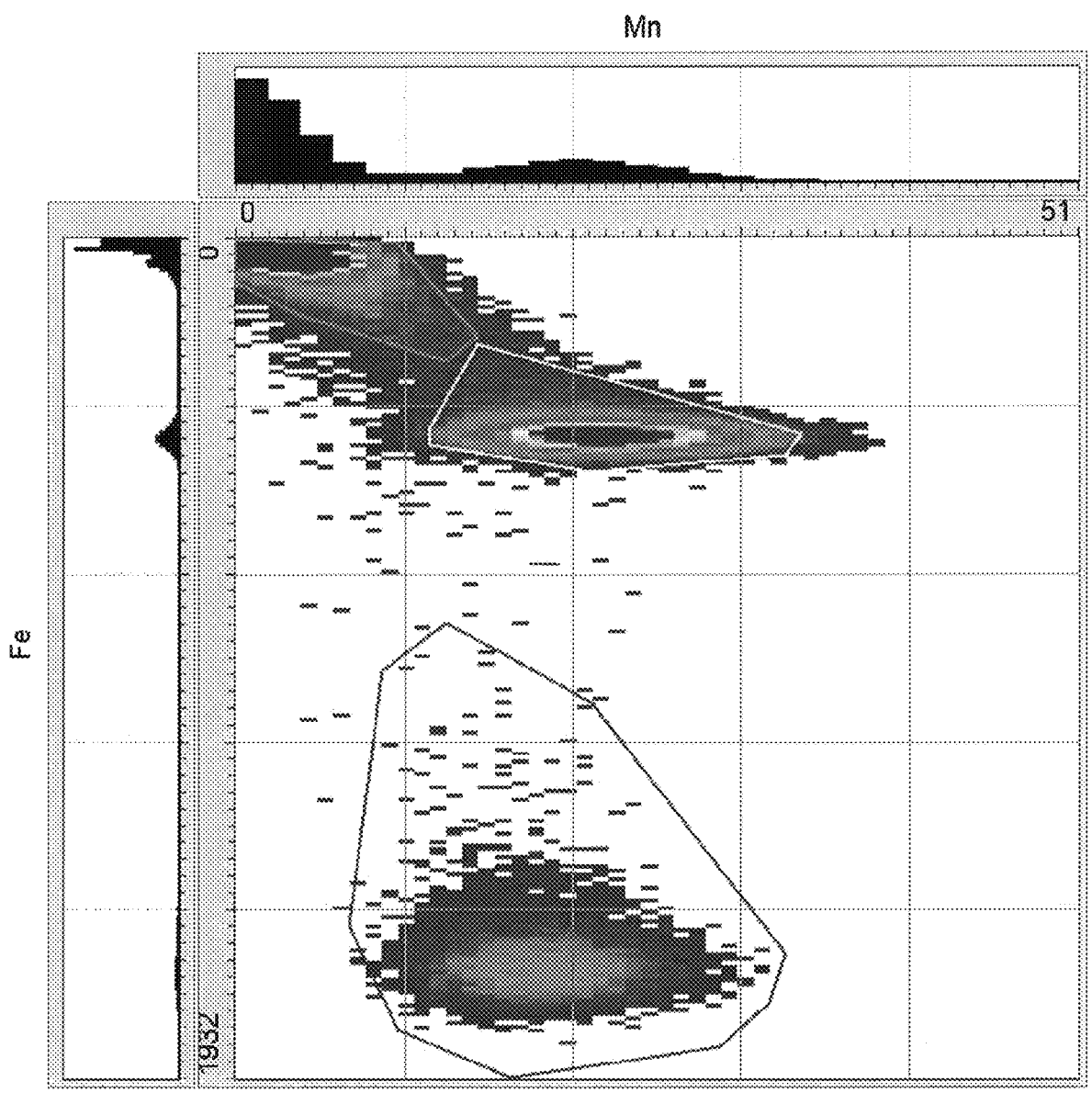
FIG. 5 is a diagram showing the results of performing clustering of data points on the binary scatter diagram shown in FIG. 4 after adjusting the cluster analysis parameters.

FIG. 5 is a binary scatter diagram showing the results of performing clustering and a cluster region detection after performing the above-described clustering parameter adjustment processing, on the same data point as in the binary scatter diagram shown in FIG. 4. According to FIG. 5, it can be seen that the portions divided into a plurality of linearly extending cluster regions in FIG. 4 are integrated into one large cluster region. On the other hand, in the region located on the lower side in the scatter diagram in which the density of the data points is originally not high, there is no change in the cluster region shape. Thus, according to the EPMA of this embodiment, even in a case where there is a large difference between the abundance of two target elements and, in particular, the intensity range is narrow because the abundance of one element is small, it is possible to perform accurate clustering by avoiding the detection of a false cluster in the binary scatter diagram.

Note that in the EPMA of the above-described embodiment, attention is paid only before and after the class indicating the maximum frequency in the parameter adjustment processing shown in FIG. 2. However, for all of the classes of the histogram (i.e., before and after all of local maximum value positions), it may be configured such that the continuous number of the classes whose frequency is 0 is determined and the largest value of the continuous number is set to a number N of continuous classes. However, in many cases, even if such processing is performed, since the selected number N of continuous classes N becomes the same as the result of the processing shown in FIG. 2, it is preferable to perform the processing shown in FIG. 2 from the view point of the calculation processing time or the like.

Second Embodiment

Figure 6:
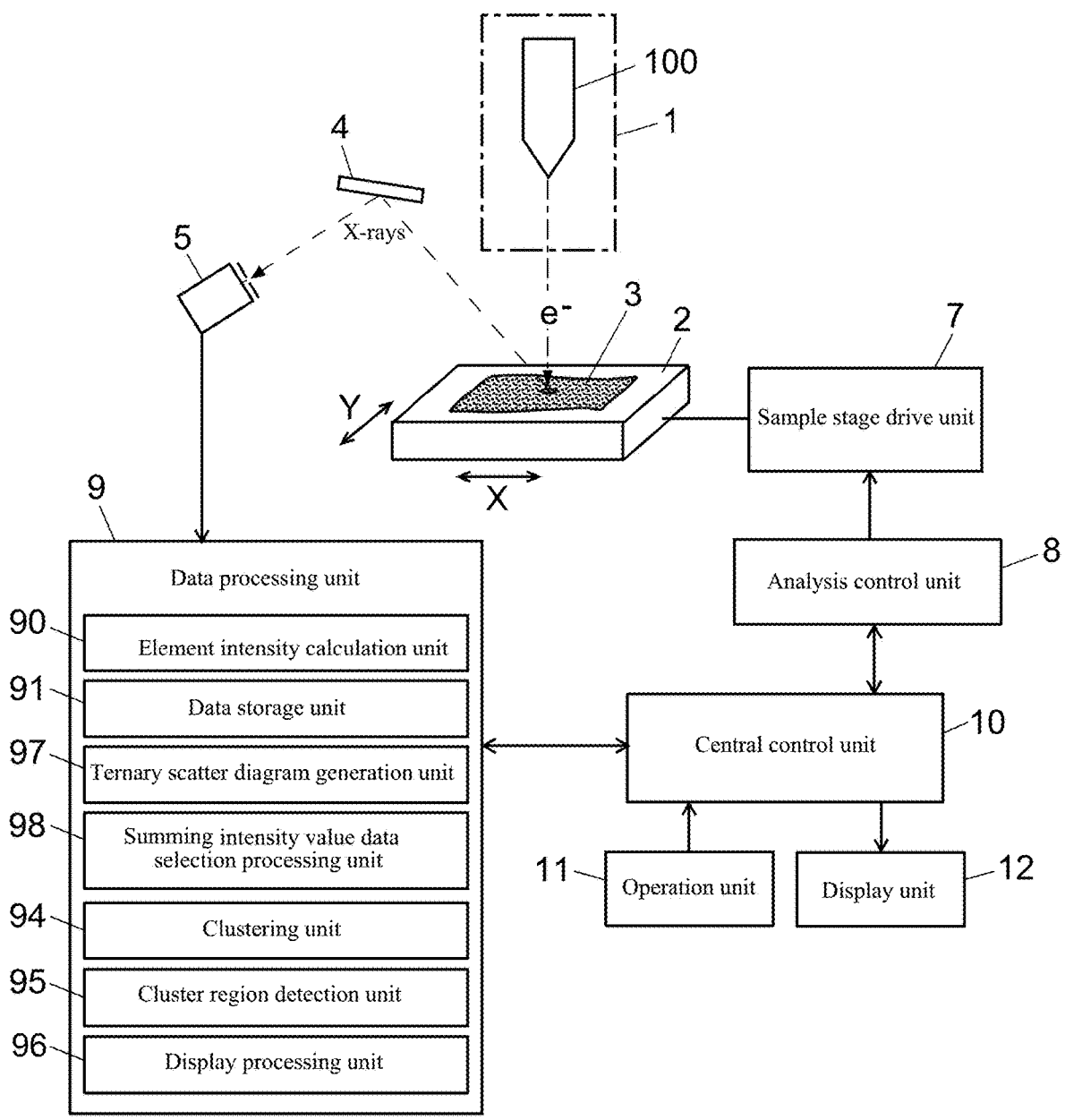
FIG. 6 is a structural view of a main part of an EPMA according to a second embodiment of the present invention.

Next, an EPMA which is a surface analyzer according to a second embodiment of the present invention will be described with reference to the accompanying figures. FIG. 6 is a configuration diagram of a main part of the EPMA of the second embodiment. In FIG. 6, the component identical or corresponding to that of the device shown in FIG. 1 is denoted by the same reference numeral.

The basic structure of the EPMA of the second embodiment is the same as that of the EPMA of the first embodiment. The difference is that in the data processing unit 9, a ternary scatter diagram generation unit 97 is provided instead of the scatter diagram generation unit 92, and a summing intensity value data selection processing unit 98 is provided instead of the clustering parameter adjustment unit 93.

In the EPMA of this embodiment, in the same manner as in the EPMA of the first embodiment, under the control of the analysis control unit 8, analyses are performed for a large number of minute regions in a two-dimensional region on the sample 3. The element intensity calculation unit 90 acquires the intensity data reflecting the abundance of the target element for each minute region in the two-dimensional region on the sample 3. This intensity data is stored in the data storage unit 91.

Figure 7:
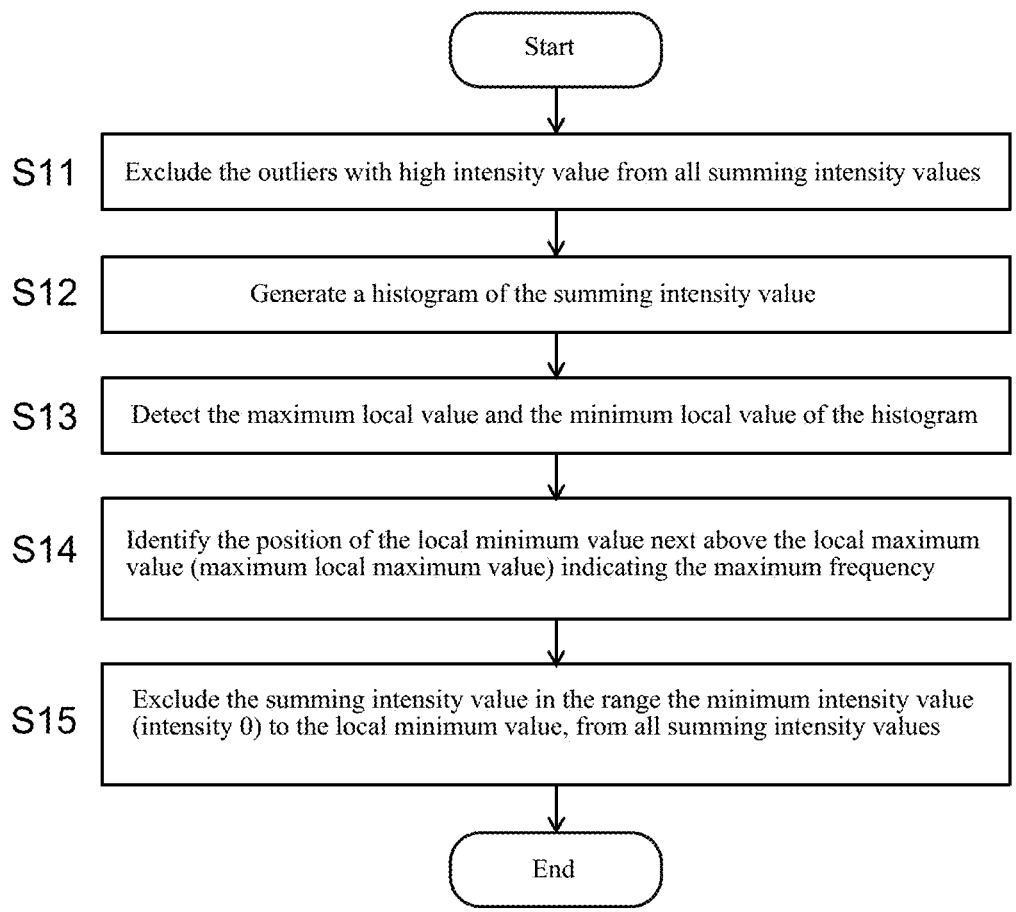
FIG. 7 is a flowchart showing an example of summing intensity value data selection processing in the EPMA of the second embodiment.
Figure 8:
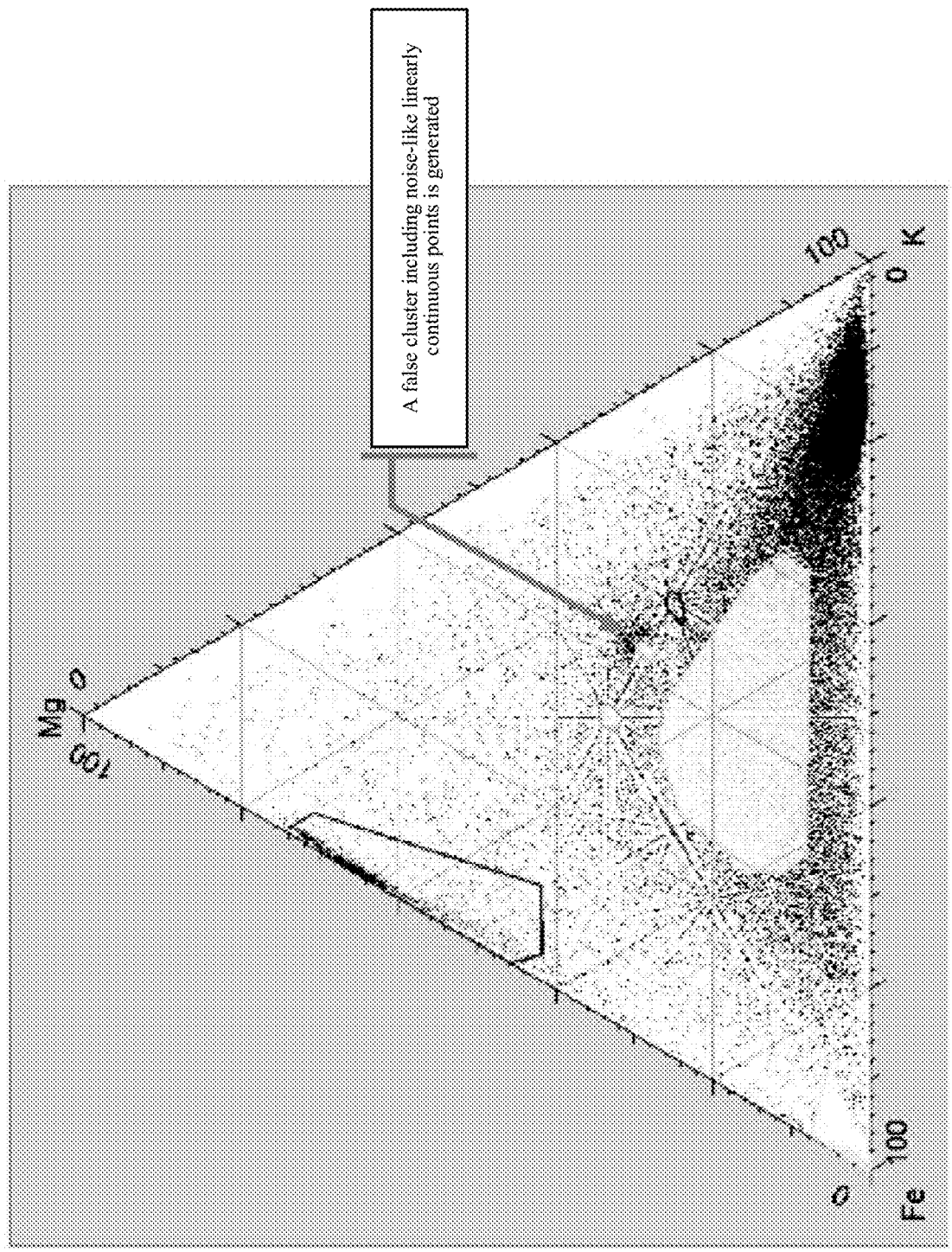
FIG. 8 is a diagram showing an example in which a false cluster is detected as a result of automatically performing clustering of data points on a ternary scatter diagram.

When an analyst performs a predetermined operation from the operation unit 11, the ternary scatter diagram generation unit 97 reads out predetermined data from the data storage unit 91, and generates a ternary scatter diagram indicating the intensity relation of the three specified elements. Each data point on the ternary scatter diagram corresponds to each minute region on the sample 3. The display processing unit 96 displays the generated ternary scatter diagram on the display unit 12. As shown in FIG. 8, in a case where a set of the linear data points extending radially in the ternary scatter diagram is observed, it is likely that accurate clustering cannot be performed even with automatic clustering. Therefore, when an analyst performs predetermined operations on the operation unit 11, the summing intensity value data selection processing unit 98 performs the following data selection processing. FIG. 7 shows a flowchart of this data selection processing.

The summing intensity value data selection processing unit 98 calculates the summed value of the intensity (hereinafter referred to as "intensity summing value") of three elements (Fe, Mg, and K in FIG. 8) shown in the ternary scatter diagram for each minute region and excludes a predetermined percentage of data from the summing intensity value in order from the larger one (Step S11). The reason and specific method for excluding the outlier are as follows.

Figure 9:
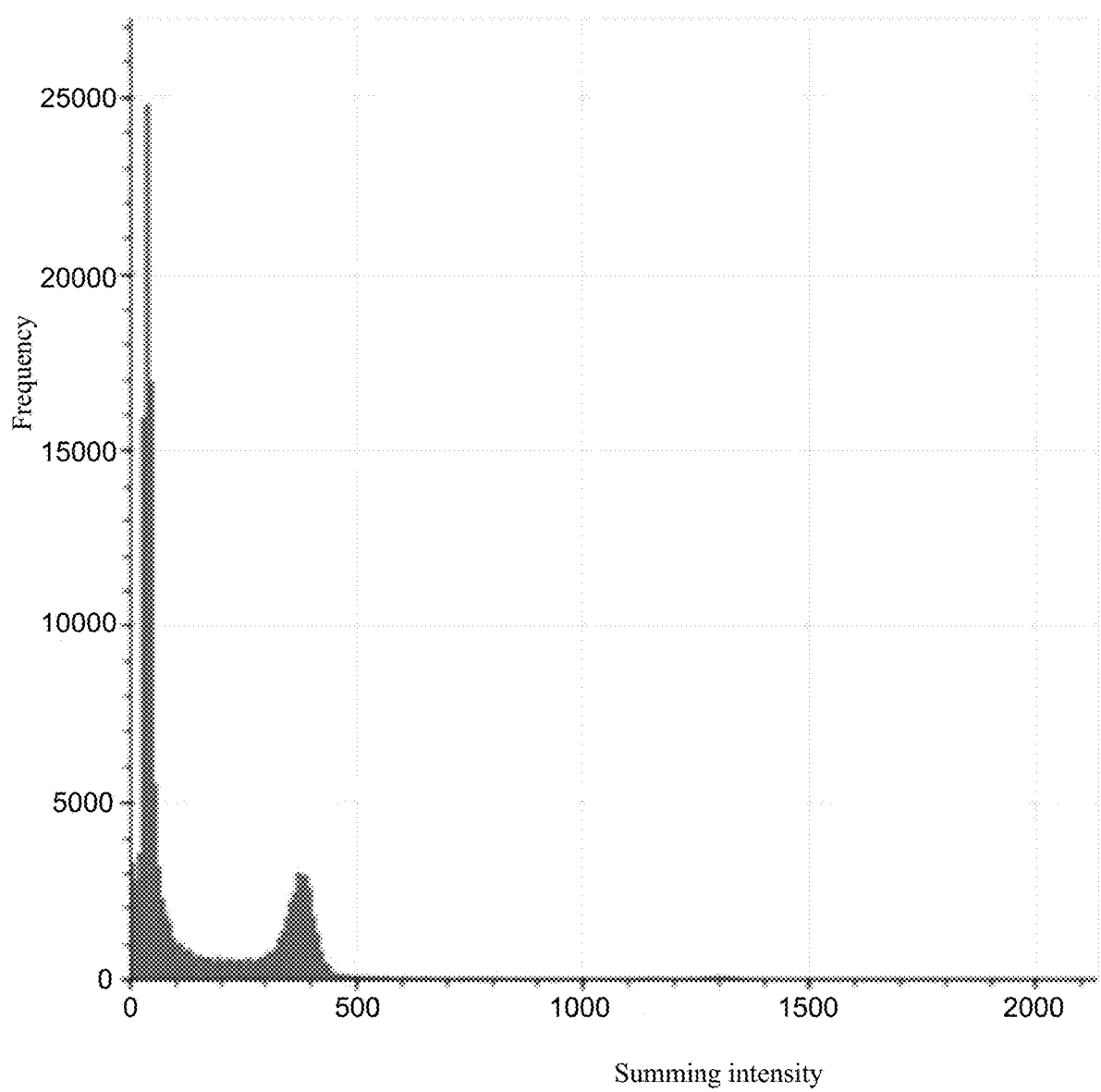
FIG. 9 is a diagram showing an example of a histogram of a summed intensity value.

FIG. 9 is a histogram of summing intensity values for all data points (i.e., minute regions on the sample 3) plotted on the ternary scatter diagram shown in FIG. 8. As shown, a significant percentage of data is unevenly distributed in a fairly small intensity range near the summing intensity value=0 to form a peak. It is assumed that such a large amount of data with smaller summing intensity values is the factor of the set of linear data points extending radially in the ternary scatter diagram. To solve it, all or a part of this data must be excluded. However, in the histogram shown in FIG. 8, the data extends to a large summing intensity value with a small frequency. For this reason, the peak exhibiting a large frequency is shaped so as to be compressed in the horizontal axis direction, and it is difficult to determine the threshold for selecting data to be excluded.

In the histogram, it is assumed that the frequency of data with a large summing intensity value is small and such data exists discretely on the horizontal axis. Therefore, by temporarily excluding such data with a large summing intensity value and re-generating a histogram, it is possible to grasp the state of the peak in the region with a small summing intensity value, that is, the distribution state of data in the histogram in more detail. Therefore, here, as one example, using an outlier detection method by quartile, which is often used in statistic processing, outliers with large summing intensity are excluded.

Generally, in an outlier detection by quartile, when all data are arranged in ascending order, the outlier is acquired by utilizing the interquartile range (IQR) which is a value obtained by subtracting the first quartile (Q1) corresponding to 25% of the total number from the third quartile (Q3) corresponding to 75% of the total number.

Specifically, the lower boundary and the upper boundary are calculated by using the following expression, and let the data on the outer side be the outlier.

Lower boundary=Q1−IQR×1.5
Upper boundary=Q3+IQR×1.5

Here, the outlier with a small value is not required. Therefore, in order to remove large value data, the data with the intensity equal to or greater than the upper boundary is excluded. Note that the method of detecting the outlier having a large value is not limited to the above-described method, and other outlier detection methods, such as a Smirnov Grabs Test, can be used, for example.

Figure 10:
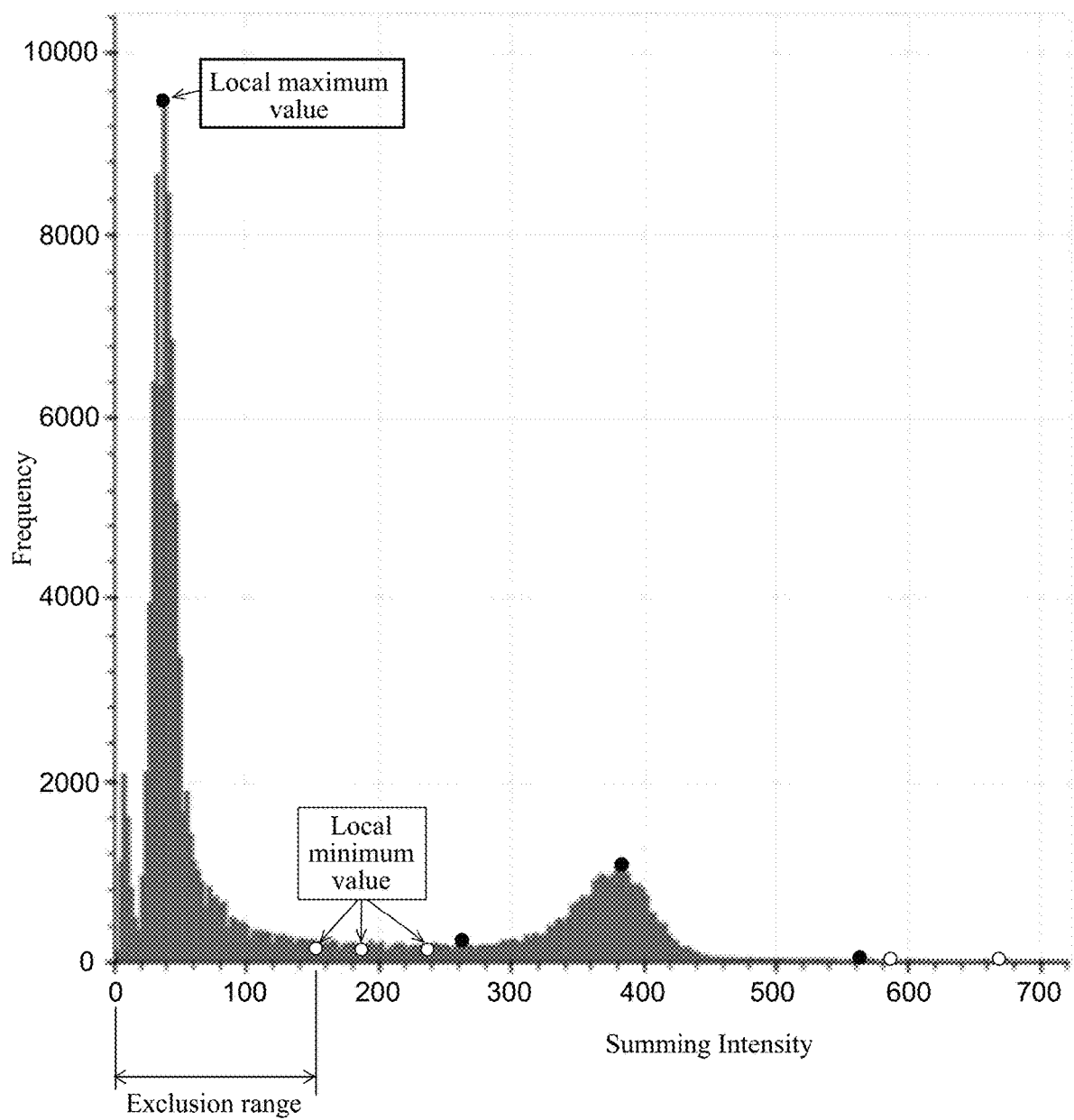
FIG. 10 is a diagram showing a histogram of a summed intensity value after excluding an outlier having a larger intensity value for the summed intensity value shown in FIG. 9.

Next, the summing intensity value data selection processing unit 98 generates a histogram from the summing intensity value data after excluding the outlier as described above (Step S12). Then, it detects a maximum (peak) position and a minimum position (class) using a predetermined algorithm in the histogram (Step S13). FIG. 10 is a histogram generated based on the data after the removal of outliers from the summing intensity value data from which the histogram was based, shown in FIG. 9. In FIG. 10, the detected local maximum value is indicated by a black circle, and the detected local minimum value is indicated by a white circle. In this case, a constant detection range is set so as not to recognize an increase or decrease in frequency in a narrow intensity range as a local maximum or a local minimum. Therefore, for example, a peak closest to the intensity=0 is not detected as a local maximum.

The summing intensity value data selection processing unit 98 identifies the closest local minimum value on the upper side than the local maximum value indicating the highest frequency (Step S14). Then, the summing intensity value data included in the intensity range from the minimum intensity, that is, the intensity=0, to the specified local minimum value is excluded from all summing intensity value data (including outliers excluded in Step S11) (Step S15). In the case of the example shown in FIG. 10, all of the summing intensity value data below the summing intensity value: 156 are excluded. This will exclude all of data forming the peak with the largest frequency in the histogram shown in FIG. 10.

Note that in the summing intensity value data after the exclusion of outliers in Step S11, the largest intensity may change (become smaller) as compared with the original data. In the examples shown in FIG. 9 and FIG. 10, the number of classes of the summing intensity value when generating the histogram is set to 256, but when the maximum intensity of data after the exclusion of outliers is less than 256, the number of classes of the intensity value needs to be adjusted accordingly. This is because if such a number of classes is not adjusted, a class whose frequency is 0 is generated in a comb-like manner in a histogram to be produced, and the position of the local minimum value cannot be accurately acquired.

The summing intensity value data selection processing unit 98 selects the clustering target data by excluding the data with a small summing intensity value and a high frequency as described above. The clustering unit 94 performs clustering by, e.g., a hierarchical density-based clustering, of data points on the ternary scatter diagram after being so selected. This labels each data point on the ternary scatter diagram point as to whether it belongs to any one or a plurality of clusters or neither. The cluster region detection unit 95 defines a polygonal cluster region that includes all or most of data points belonging to each cluster, by using any suitable method, such as, e.g., a convex hull method.

Figure 11:
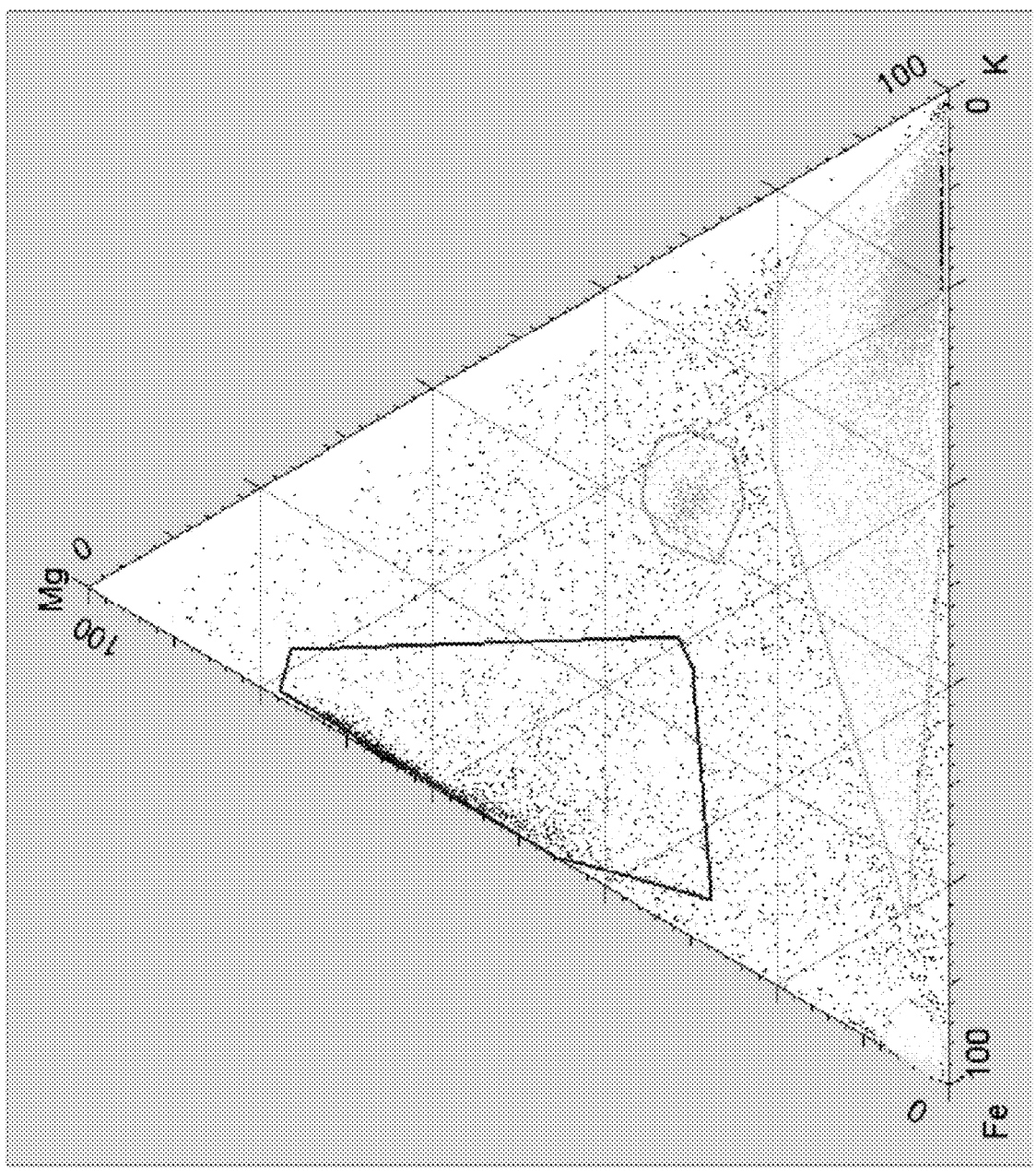
FIG. 11 is a diagram showing a result of performing clustering of data points on the ternary scatter diagram shown in FIG. 8 after performing summing intensity value data selection processing.
Figure 12:
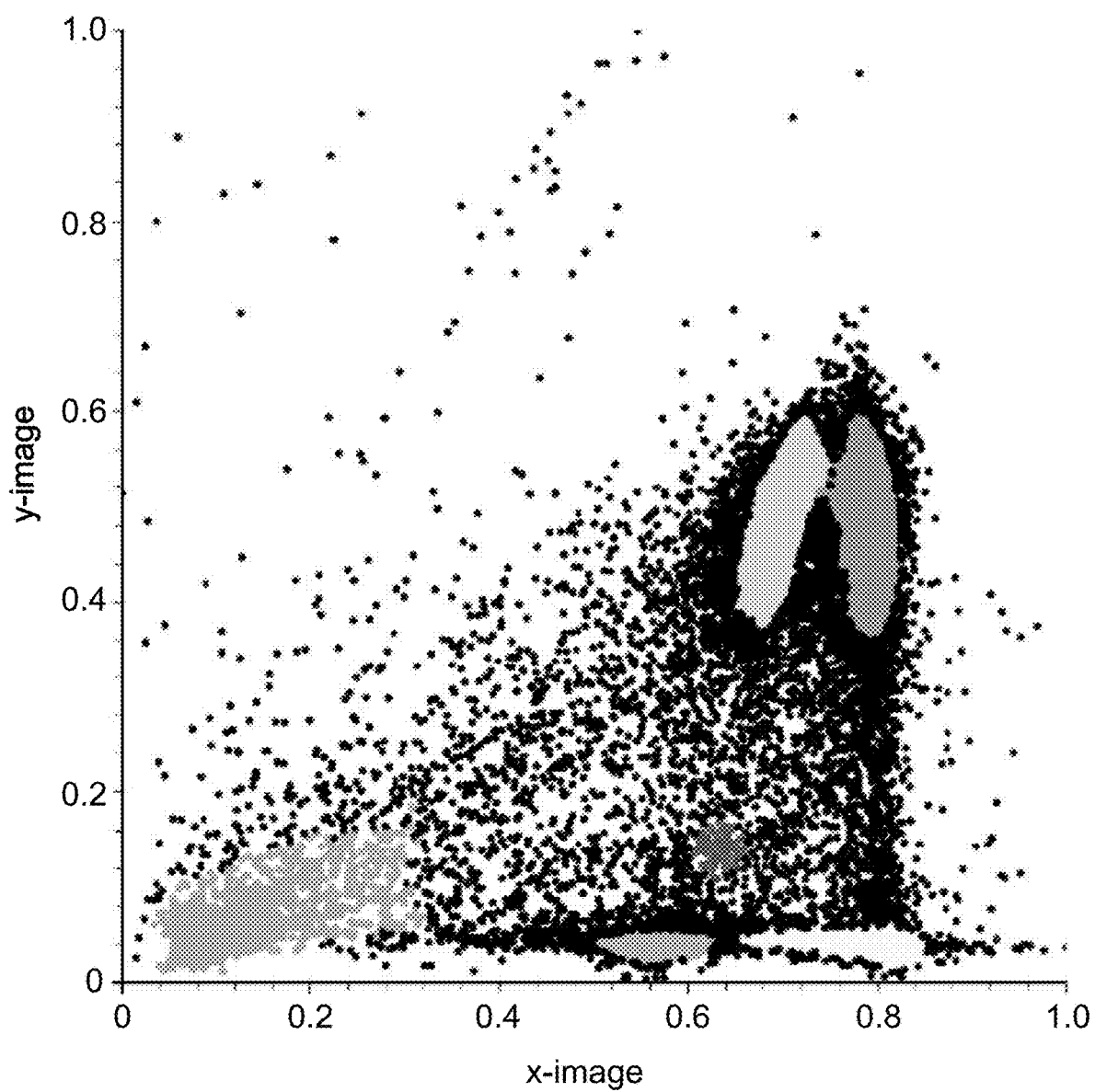
FIG. 12 is a diagram showing an example of a result of automatically performing clustering of a binary scatter diagram.

FIG. 11 is a ternary scatter diagram showing the result of the clustering performed after summing intensity value data selection processing described above is performed on data points in the ternary scatter diagram shown in FIG. 8 to reduce the data points. In FIG. 11, the distribution of the radially extending linear data points appeared in the ternary scatter diagram shown in FIG. 8 has been eliminated, and no cluster which is expected to be a false cluster has been detected. Therefore, it is assumed that clustering has been carried out properly.

In this way, in the EPMA of the second embodiment, the set of the noisy data points appearing in a ternary scatter diagram can be excluded from clustering processing. Thereby, erroneous cluster regions can be suppressed from being detected. Consequently, detection accuracy of a cluster on a ternary scatter diagram can be improved, which in turn can be used to improve the accuracy and effectiveness of a phase analysis.

In the above explanation, in the histogram shown in FIG. 10, the data included in the intensity range from the intensity=0 up to the closest local minimum value on the upper side than the local maximum value indicating the maximum frequency was excluded. However, the intensity range of data to be excluded can be appropriately changed in accordance with the distribution state of data or the like. For example, it may be configured such that the user can select the intensity range of the data to be excluded. Alternatively, it may be configured such that a plurality of clustering results is acquired by performing clustering of each data group after excluding a plurality of data different in intensity range, and these results are presented collectively to a user.

Further, data selection processing as described above need not be performed at all times. Therefore, as described above, data selection processing may be performed in response to the user's manipulation. Alternatively, data selection processing may be automatically executed according to the clustering result or the like.

The first and second embodiments are directed to an EPMA. However, the present invention is applicable to a variety of analyzers in general, such as, e.g., an SEM, a fluorescent X-ray analyzer, and the like, which are capable of acquiring a signal reflecting the amount of an element or a component (such as a compound) in a large number of minute regions in a one-dimensional or two-dimensional area on a sample. That is, the present invention can be applied to an analyzer capable of performing a mapping analysis regardless of a measuring method or an analysis method itself.

Further note that the above-described embodiments are merely examples of the present invention, and it is needless to say that the present application is encompassed by claims even when appropriately modified, changed, added, and the like within the spirit of the present invention

VARIOUS EMBODIMENTS

It is apparent to those skilled in the art that the above-described exemplary embodiments are specific examples of the following aspects.

(Item 1)

A surface analyzer according to one aspect of the present invention, comprising:

a measurement unit configured to acquire a signal reflecting a quantity of a plurality of components or elements that are analysis targets at a plurality of positions on a sample;

a scatter diagram generation unit configured to generate a binary scatter diagram based on a measurement result by the measurement unit;

a clustering unit configured to perform clustering of points on the binary scatter diagram using a method of a density-based clustering; and a parameter adjustment unit configured to adjust a distance threshold by utilizing distribution information on a signal value of the components or the elements on either axis in the binary scatter diagram analysis, the distance threshold being one of parameters to be set in the density-based clustering.

(Item 2)

In the surface analyzer as recited in the above-described Item 1, it may be configured such that the parameter adjustment unit adjusts the distance threshold by utilizing a distribution of signal values of the components or the elements in which a range of the signal value is narrower in the binary scatter diagram.

For example, in a case where there is a large difference in the abundance of two elements contained in a sample, a set of a plurality of linear data points may appear in close proximity on the binary scatter diagram due to the much narrower intensity range of the element with the smaller abundance. According to the surface analyzer described in the above-described items 1 and 2, the set of the plurality of linear data points can be recognized as one cluster without being erroneously recognized as a separate cluster.

In other words, according to the surface analyzer as recited in the above-described Items 1 and 2, it is possible to suppress the detection of a false cluster when automatically clustering data points plotted on a binary scatter diagram and improve the accuracy of clustering of data points, that is, minute regions on a sample based on the abundance or concentration of a plurality of components or elements. Thereby, the user can accurately perform the phase analysis based on, for example, the clustering result.

(Item 3)

In the surface analyzer as recited in the above-described Item 2, it may be configured such that the parameter adjustment unit generates a histogram of the signal values of the components or the elements and adjusts the distance threshold based on a distribution of frequencies before and after a signal value class indicating at least one local maximum value in the histogram.

(Item 4)

Further, the surface analyzer as recited in the above-described Item 3, it may be configured such that the parameter adjustment unit adjusts the distance threshold based on a distribution of frequencies before and after a signal value class indicating a local maximum value at which a frequency is maximum in the histogram.

According to the surface analyzer as described in the above-described Items 3 and 4, it is possible to extract a region which is easily erroneously detected as a false cluster in a binary scatter diagram, and which is characteristically distributed by data points, and appropriately determine a parameter (distance threshold) of clustering so as to avoid a detection a false cluster in the region. In addition, since the processing for adjusting such parameters is simple, the processing is not time-consuming and, for example, the clustering result can be quickly displayed.

(Item 5)

In the surface analyzer as recited in any one of the above-described Items 1 to 4, it may be configured such that the clustering unit performs hierarchical density-based clustering.

According to the surface analyzer described in the above-described Item 5, it is possible to perform clustering of data points on the binary scatter diagram, which is generated based on the data collected by, for example, an EPMA, in a good manner. Thus, the user can accurately perform the phase analysis based on the clustering result.

(Item 6)

A surface analyzer according to another aspect of the present invention, comprising:

a measurement unit configured to acquire a signal reflecting a quantity of a plurality of components or elements that are analysis targets at a plurality of positions on a sample;

a scatter diagram generation unit configured to generate a ternary scatter diagram based on a measurement result by the measurement unit;

a data point selection unit configured to exclude, by utilizing distribution information on a summing signal value acquired by adding signal values of three components or elements corresponding to data points in the ternary scatter diagram, data points having a predetermined signal value range in which the summing signal value is relatively small from all data points present in the ternary scatter diagram; and a clustering unit configured to perform clustering of the data points in the ternary scatter diagram that has not been excluded by the data point selection unit, by using a method of a density-based clustering.

For example, in a case where there are a large number of data points whose ratios of the signal value of the three elements contained in a sample are approximately the same, a distribution of the linear data points extending radially in the ternary scatter diagram may appear, which may cause a false cluster to be detected. According to the surface analyzer as recited in the above-described Item 6, it is possible to eliminate the characteristic distribution of the data points causing such a false cluster. It is thereby possible to suppress the detection of a false cluster when automatically clustering the data points plotted on a ternary scatter diagram and improve the accuracy of clustering ofits data points, i.e., minute regions on a sample based on the abundance or concentration of a plurality of components or elements. Thereby, the user can accurately perform a phase analysis based on, for example, the clustering result.

(Item 7)

The surface analyzer as recited in the above-described Item 6, it may be configured such that the data point selection unit generates a histogram of the summing signal value and determines a signal value range of data to be excluded by utilizing a class indicating a local maximum value and/or a local minimum value detected in the histogram.

According to the surface analyzer as recited in the above-described item 6, it is possible to accurately exclude data points in which the summing signal value is relatively small and frequency is large, the data points being likely to cause a false cluster. This not only excludes the data points which is likely to cause a false cluster, but also avoids undesired exclusion of data points which is not likely to cause a false cluster, so that an accurate cluster region can be defined in the ternary scatter diagram.

(Item 8)

In the surface analyzer as recited in the above-described Item 6 or 7, it may be configured such that the clustering unit performs hierarchical density-based clustering.

According to the surface analyzer as recited in the above-described Item 8, it is possible to perform clustering of data points on the ternary scatter map generated based on the data collected by, for example, an EPMA or the like in a good manner. Thus, the user can accurately perform the phase analysis based on the clustering result.

DESCRIPTION OF SYMBOLS

1: Electron beam irradiation unit
100: Electron gun
2: Sample stage
3: Sample
4: Dispersive crystal
5: X-ray detector
7: Sample stage drive unit
8: Analysis control unit
9: Data processing unit
90: Element intensity calculation unit
91: Data storage unit
92: Scatter diagram generation unit
93: Clustering parameter adjustment unit
94: Clustering unit
95: Raster region detection unit
96: Display processing unit
97: Ternary scatter diagram generation unit
98: Addition intensity value data selection processing unit
10: Central control unit
11: Operation unit
12: Display unit

The invention claimed is:

1. A surface analyzer comprising:
a measurement unit configured to acquire a signal reflecting a quantity of a plurality of components or elements that are analysis targets at a plurality of positions on a sample;
a scatter diagram generation unit configured to generate a binary scatter diagram based on a measurement result by the measurement unit;
a clustering unit configured to perform clustering of data points on the binary scatter diagram using a method of a density-based clustering; and
a parameter adjustment unit configured to adjust a distance threshold by utilizing distribution information on a signal value of the components or the elements on either axis in the binary scatter diagram, the distance threshold being one of parameters to be set in the density-based clustering.

2. The surface analyzer as recited in claim 1,
wherein the parameter adjustment unit adjusts the distance threshold by utilizing a distribution of signal values of the components or the elements in which a range of the signal value is narrower in the binary scatter diagram.

3. The surface analyzer as recited in claim 2,
wherein the parameter adjustment unit generates a histogram of the signal values of the components or the elements and adjusts the distance threshold based on a distribution of frequencies before and after a signal value class indicating at least one local maximum value in the histogram.

4. The surface analyzer as recited in claim 3,
wherein the parameter adjustment unit adjusts the distance threshold based on a distribution of frequencies before and after a signal value class indicating a local maximum value at which a frequency is maximum in the histogram.

5. The surface analyzer as recited in claim 1,
wherein the clustering unit performs hierarchical density-based clustering.

6. A surface analyzer comprising:
a measurement unit configured to acquire a signal reflecting a quantity of a plurality of components or elements that are analysis targets at a plurality of positions on a sample;
a scatter diagram generation unit configured to generate a ternary scatter diagram based on a measurement result by the measurement unit;
a data point selection unit configured to exclude, by utilizing distribution information on an summing signal value acquired by adding signal values of three components or elements corresponding to data points in the ternary scatter diagram, data points having a predetermined signal value range in which the summing signal value is relatively small from all data points present in the ternary scatter diagram; and
a clustering unit configured to perform clustering of the data points on the ternary scatter diagram that has not been excluded by the data point selection unit, by using a method of a density-based clustering.

7. The surface analyzer as recited in claim 6,
wherein the data point selection unit generates a histogram of the summing signal value and determines a signal value range of data to be excluded by utilizing a class indicating a local maximum value and/or a local minimum value detected in the histogram.

8. The surface analyzer as recited in claim 6,
wherein the clustering unit performs hierarchical density-based clustering.

* * * * *